United States Patent Office 2,904,402
Patented Sept. 15, 1959

2,904,402

METHOD OF FORMING UNIFORM UNCONTAMINATED IRON OXIDE FOR PIGMENT AND OTHER USES

Paul Alfons Florent Cauterman, Oakville, Ontario, Canada, assignor to Northern Pigment Company, Limited, New Toronto, Ontario, Canada No Drawing. Application December 30, 1955
Serial No. 556,429

8 Claims. (Cl. 23—200)

This invention relates to methods for forming uniform iron oxides substantially free from contaminants.

There are two generally established processes for forming iron oxide pigments. The earlier process set forth in U.S. patent to Penniman and Zoph, 1,368,748, uses lime or calcium hydroxide for a starter solution containing a sulphate of iron. Insoluble calcium sulphate is precipitated in large quantity. Because of the difficulty in removing the calcium sulphate except with impractical amounts of water, the final pigment contains a high percentage of calcium sulphate therein, though otherwise the color purity of the pigment is generally regarded as superior to that produced by alternative processes.

The colloidal ferric hydrate used in the Penniman and Zoph pigment forming process in contact with iron, acts as a nucleus for the formation of pigment particles. The colloidal particles of ferric hydrate are referred to herein as "pigment seeds." The formation of pigment seeds by the addition of a precipitation agent to an iron salt is recognized as a separate step from the formation of pigment from the seeds by subjecting the latter to contact with metallic iron in the presence of ferrous sulphate solution.

The amount of calcium sulphate present in the final pigment produced by the Penniman and Zoph process required such unwieldy and extensive washing procedures for the elimination of same that commercially used pigments at that time contained between six and eight percent of calcium sulphate which in general use interfered seriously with the use of these pigments in a large number of applications.

A small portion of calcium sulphate will remain in solution during the seed and pigment forming processes as an active component and has not been regarded heretofore as a contaminant. While the art has recognized the necessity of reducing precipitated calcium sulphate as a contaminant, there appears to have been no recognition of a variety of complex salts from which derive misformed seeds which are adapted to act as a source of unduly large pigment growth or detract from the perfection and uniformity of pigment crystal growth from uniform, pure pigment seeds. Such complex salts in this specification are classed as active contaminants which seriously detract from the uniformity of seed formation and pigment growth from seeds. Moreover, the uniformity of a pigment is seriously affected by oversize contaminants and in particular, particles of precipitated calcium sulphate which occur up to a size even greater than twenty-five times the size of a pigment particle.

Plews in his U.S. Patent 2,111,727 disclosed the formation of pigment seeds as set forth by Penniman and Zoph with sodium hydroxide in the starter solution. By reason of the greater solubility of the sodium salts formed during the seed forming process in which ferrous sulphate was placed in solution with the sodium hydroxide to form ferrous hydroxide seed particles in suspension in a solution of sodium sulphate, the elimination of the sodium sulphate by a relatively small amount of water could be efficiently accomplished at the final pigment forming stage but left all other contaminants including oversized particles which were originally with the seeds. The Plews method is accompanied by a much larger occurrence of active contaminants which deleteriously affect uniformity of crystal growth and clarity of resulting colour.

The art at the present time recognizes the superiority in purity and luminosity of colour of yellow pigments formed by the Zoph lime process as contrasted with the muddiness or low reflectance characteristics of the yellows produced by the Plews method.

In both of the foregoing general types of pigment seed forming processes, the colour reflectance in the pigment produced is affected by the size range of pigment particles produced which is again affected by the size of the seed particles and in particular, contaminants and oversized particles derived from both active and inactive contaminants. There are two main stages in the overall pigment forming process in which the first or seed forming part has been described and following which the ferrous or ferric hydroxide seed particles thus produced and contaminated by either lime or sodium salts, complex salts and oversized particles, are oxidized while in contact with metallic iron in iron sulphate solution in a second part during which the seeds grow or otherwise give rise to the formation of yellow or red iron oxide particles.

According to the invention, the production of a yellow iron oxide pigment of high reflectance, purity and uniformity, is provided by controlling the formation of the seeds in a Zoph type of lime process whereby precipitated calcium salts, complex salts and oversized particles may be eliminated preferably before the pigment seeds are oxidized while in contact with metallic iron in the pigment forming stage of the process.

It is a second object of the invention to provide improvements in an iron oxide pigment forming process in which the pigment seeds and contaminants may be sized to control uniformity in the size of pigment particles formed by thus utilizing the pigment seeds alone substantially devoid of contaminants.

It is another object of the invention to substantially improve the output efficiency of pigment production with present processing apparatus.

It is a still further object of the invention to provide a yellow iron oxide pigment of high reflectance, purity and uniformity by a lime type of pigment forming process wherein the pigment seeds are centrifuged preferably before oxidation in contact with metallic iron to eliminate active and inactive contaminants and to substantially double production output in the Penniman and Zoph or Plews types of processes.

It is a still further object of the invention to provide a pigment forming process in which the particle size in the pigment is controlled by centrifuging in addition to the elimination of contaminating salts therefrom.

Other objects of the invention will be appreciated by a study of the following specification setting forth the preferred practice of the invention.

By way of example, pigment seeds of the invention may be formed as follows:

To 3,000 gallons of water in a wooden tank is added 500 pounds of calcium hydroxide. To the lime dispersion thus formed is added 1,000 pounds of ferrous sulphate in solution to form ferrous pigment seeds in the form of ferrous hydroxide as a suspension in a calcium sulphate solution. About 500 pounds of ferrous hydroxide seeds will be formed in suspension at this stage accompanied by about 900 pounds of a calcium sulphate precipitation.

As a second stage of the seed forming process, 2,000 pounds of ferrous sulphate are added in solution in 1,000 gallons of water and air is bubbled through the tank to oxidize the ferrous seeds to ferric hydroxide in suspension in a water and ferrous sulphate solution. The ferric hydroxide seeds are yellow in colour. If a red forming seed is desired, then instead of adding ferrous sulphate in the second stage of seed development, ferric sulphate may be added.

It will be apparent that at the conclusion of this second seed forming stage, there will be present a large proportion of precipitated calcium sulphate. In the prior art methods, the tank contents were oxidized in contact with metallic iron in the presence of copious amounts of water sufficient to provide water of solution for the calcium sulphate to reduce the amount thereof remaining in suspension to about six to eight percent. The unwieldy practice required for eliminating the calcium sulphate by the addition of water of solution essentially prevented the economical and practical attainment of a final pigment containing less than about six percent of calcium sulphate as a contaminant, therefore leading to the development of the Plews process employing alkali metal salts of much greater solubility in the starter solution.

By way of contrast, however, the present invention provides for the removal of the calcium sulphate in suspension by centrifuging the tank contents to reduce the calcium sulphate to about five percent by weight or less of the ferric seeds. The thus classified tank contents in the present example hereinafter referred to as a seed suspension, will contain approximately five hundred pounds of yellow or red forming pigment seeds, as the case may be, contaminated by about twenty-five pounds of precipitated calcium sulphate or less, in 4,000 gallons of water containing an excess of a sulphate of iron.

According to the invention, the seed suspension for use in pigment formation may be washed with a thousand gallons of water or sufficient water of solution at this stage to dissolve the precipitated calcium sulphate.

It will be appreciated that the pigment seed forming process of the invention is adapted to deliver a yellow or red forming pigment seed free of calcium sulphate or substantially free thereof. Assuming as a further alternative that a pigment seed of the invention having five percent of contaminants is used in the formation of an iron oxide pigment, then the procedure may be as follows:

The pigment seed in suspension obtained from said tank after classification as described, is placed in a tank containing scrap iron with sufficient water of solution to take up the calcium sulphate. The water of solution will contain an excess of ferrous or ferric sulphate. With the addition of heat and air in the conventional manner, a colloidal iron oxide pigment is formed. Thus, for example, 5,000 pounds of colloidal iron oxide pigment may be formed while the amount of contaminant from the original 500 pounds of pigment seeds may remain at twenty-five pounds of calcium sulphate.

It is contemplated herein that the iron oxide particle or crystal growth may be controlled during pigment formation from a seed suspension by control of the viscosity of the colloidal iron oxide mass during formation thereof. Maintenance of a high viscosity suspension throughout pigment formation will tend toward the slow formation of fine particles whereas the addition of water to provide a low colloidal viscosity throughout pigment formation will provide coarse particles and in addition, will bring any remaining calcium sulphate into solution.

The resulting pigment may be affected in its reflectance and contamination by control of grain size affected by control of viscosity during pigment formation. Control of viscosity of the colloidal iron oxide gel during growth therefore forms a part of this invention in conjunction with the sizing of the pigment seeds effected during classification in the final stage of formation of the latter.

The classification of the pigment seed tank contents as before described in the latter stage of formation of the pigment seeds may, by centrifuging, be adjusted to remove not only precipitated calcium sulphate but also a portion of the pigment seeds and in particular, those oversized seeds containing active contaminants. This aspect of the invention enables the deliverance of pigment seeds not only of a low order of contamination by active and inactive contaminants but of more regular size uniformity by reason of the elimination also of misformed seeds derived from active contaminants. Formation of iron oxide pigments from the thus sized and contamination controlled seeds enables the production of a highly uniform pigment from uniform seeds of negligible contamination.

The elimination of both active and inactive contaminants and the uniformity of pigment form accomplished by practice according to the invention, permits the use of iron oxide produced thereby in applications where regularity of sizing of the iron oxide particles and freedom from contamination thereof is of importance. Accordingly, iron oxide produced by the process herein is not only of utility as a pigment but is also of use in other applications as in core materials for use in high frequency magnetic fields and the like and as a material adapted for reduction and sintering to form a structural metal by powdered metallurgy techniques.

While the invention contemplates that classification of the pigment seeds be accomplished at the end of the seed forming process, it is also contemplated herein that the active and inactive contaminants may be eliminated at an intermediate point in the formation of the seeds such as after the first precipitation stage to form ferrous hydroxide. Separation of the contaminants from the colloidal seed gel obtained at this stage is more difficult to practice successfully than if carried out after the second stage of final seed formation for the reason that the colloidal gel at the intermediate stage before oxidation is delicate and the oxidation stage of seed formation must be proceeded with soon after the formation of ferrous hydroxide. Accordingly, substantially immediate classification upon formation of ferrous hydroxide followed by substantially immediate oxidation of the classified colloidal gel, is desirable for the successful formation of seeds free of active and inactive contaminants in accordance with this modified procedure. In general, however, the invention contemplates classification to eliminate contaminants before substantial pigment crystal growth has been achieved.

It is to be noted that practice of the invention has been accomplished successfully in production at considerable risk having regard to difficulty of predicting the effect of centrifuging practice on the colloidal seed gel. Contrary to expectation, the colloidal gel was not deleteriously affected in any way but rather was enhanced in its gel forming characteristics to a degree which cannot be accounted for having regard to the elimination of contaminants and sizing alone. It is also of interest to record that while a marked decrease in production rate was not expected, there was no indication at the outset that an increase in output of thirty-five percent and greater would be experienced. It appears fortuitous therefore that practice according to the invention, particularly with a lime type starter solution, enables substantially twice the former output of a superior pigment of enhanced uniformity and clarity of color.

The present invention provides for the manufacture of iron oxide for pigment and other uses by centrifuging to substantially remove active and inactive contaminants to render the colloidal iron oxide growth more active and more uniform. The general requirements of the process entail beginning with a starter solution comprising a suitable sulphate of iron with an alkali which forms a fine particle suspension of an hydroxide of iron containing both active and inactive contaminants. The suspension is oxidized to form pigment seeds at which stage it is preferred to practice classification for removal of active and inactive contaminants. A colloidal iron oxide gel is formed by contacting the pigment seeds with metallic iron in the presence of a sulphate of iron preferably with accompanying viscosity control to control iron oxide crystal formation.

While there has been described what is at present considered a preferred embodiment of the present invention, it will be appreciated by those skilled in the art that various changes and modifications can be made therein without departing from the essence of the invention and it is intended to cover herein all such changes and modifications as come within the true spirit and scope of the appended claims.

What I claim as my invention is:

1. The method of manufacturing iron oxide for pigment and other uses, comprising the steps in combination of: forming a starter solution of a sulphate of iron with an alkali to form a fine particle suspension of an hydroxide of iron containing active and inactive contaminants; oxidizing said suspension to form pigment seeds; contacting the pigment seeds with metallic iron in the presence of a sulphate of iron and oxygen to form a colloidal iron oxide gel; and before contacting said pigment seeds with metallic iron substantially removing said active and inactive contaminants by centrifuging said suspension to render said colloidal iron oxide more uniform and more active in growth whereby to provide substantially uniform uncontaminated iron oxide.

2. The method of manufacturing iron oxide for pigment and other uses, comprising the steps in combination of: forming a starter solution of a sulphate of iron with an alkali to form a fine particle suspension of an hydroxide of iron containing active and inactive contaminants; oxidizing said suspension to form pigment seeds; contacting the pigment seeds with metallic iron in the presence of a sulphate of iron and oxygen to form a colloidal iron oxide gel; and before oxidation of said suspension substantially removing said active and inactive contaminants by centrifuging to render said colloidal iron oxide more uniform and more active in growth whereby to provide substantially uniform uncontaminated iron oxide.

3. The method of manufacturing iron oxide for pigment and other uses, comprising the steps in combination of: forming a starter solution of a sulphate of iron with an alkali to form a fine particle suspension of an hydroxide of iron containing active and inactive contaminants; oxidizing said suspension to form pigment seeds; contacting the pigment seeds with metallic iron in the presence of a sulphate of iron and oxygen to form a colloidal iron oxide gel; and before contacting said pigment seeds with metallic iron substantially removing said active and inactive contaminants from said pigment seeds by centrifuging to render said colloidal iron oxide more uniform and more active in growth whereby to provide substantially uniform uncontaminated iron oxide.

4. The method of manufacturing iron oxide for pigment and other uses, comprising the steps in combination of: forming a starter solution of a sulphate of iron with an alkali to form a fine particle suspension of an hydroxide of iron containing active and inactive contaminants; oxidizing said suspension to form pigment seeds; contacting the pigment seeds with metallic iron in the presence of a sulphate of iron and oxygen to form a colloidal iron oxide gel; and before contacting said pigment seeds with metallic iron substantially removing said active and inactive contaminants from said pigment seeds including oversized seeds by centrifuging to render said colloidal iron oxide more uniform and more active in growth whereby to provide substantially uniform uncontaminated iron oxide.

5. The method of manufacturing iron oxide for pigment and other uses, comprising the steps in combination of: forming a starter solution of a sulphate of iron with an alkali to form a fine particle suspension of an hydroxide of iron containing active and inactive contaminants; oxidizing said suspension to form pigment seeds; contacting the pigment seeds with metallic iron in the presence of a sulphate of iron and oxygen to form a colloidal iron oxide gel; and before contacting said pigment seeds with metallic iron substantially removing said active and inactive contaminants by centrifuging to render said colloidal iron oxide more uniform and more active in growth whereby to provide substantially uniform uncontaminated iron oxide; and during formation of said iron oxide gel, controlling the water content thereof to provide a gel viscosity conducive to the formation of iron oxide of desired crystal size.

6. The method of manufacturing iron oxide for pigment and other uses, comprising the steps in combination of: forming a starter solution of a sulphate of iron with an alkali to form a fine particle suspension of an hydroxide of iron containing active and inactive contaminants; oxidizing said suspension to form pigment seeds; contacting the pigment seeds with metallic iron in the presence of a sulphate of iron and oxygen to form a colloidal iron oxide gel; before oxidation of said suspension substantially removing said active and inactive contaminants by centrifuging to render said colloidal iron oxide more uniform and more active in growth whereby to provide substantially uniform uncontaminated iron oxide; and controlling the viscosity of said colloidal iron oxide gel during formation thereof to control the crystal size of iron oxide formation.

7. The method of manufacturing iron oxide for pigment and other uses, comprising the steps in combination of: forming a starter solution of a sulphate or iron with an alkali to form a fine particle suspension of an hydroxide of iron containing active and inactive contaminants; oxidizing said suspension to form pigment seeds; contacting the pigment seeds with metallic iron in the presence of a sulphate of iron and oxygen to form a colloidal iron oxide gel; and before contacting said pigment seeds with metallic iron substantially removing said active and inactive contaminants from said pigment seeds by centrifuging to render said colloidal iron oxide more uniform and more active in growth whereby to provide substantially uniform uncontaminated iron oxide; and during formation of said iron oxide gel, controlling the water content thereof to provide a gel viscosity conducive to the formation of iron oxide of desired crystal size.

8. The method of manufacturing iron oxide for pigment and other uses, comprising the steps in combination of: forming a starter solution of a sulphate of iron with an alkali to form a fine particle suspension of an hydroxide of iron containing active and inactive contaminants; oxidizing said suspension to form pigment seeds; contacting the pigment seeds with metallic iron in the presence of a sulphate of iron and oxygen to form a colloidal iron oxide gel; and before contacting said pigment seeds with metallic iron substantially removing said active and inactive contaminants from said pigment seeds including oversized seeds by centrifuging to render said colloidal iron oxide more uniform and more active in growth whereby to provide substantially uniform uncontaminated iron oxide; and during formation of said iron oxide gel, controlling the water content thereof to provide a gel viscosity conducive to the formation of iron oxide of desired crystal size.

References Cited in the file of this patent

UNITED STATES PATENTS

| | | |
|---|---|---|
| 691,324 | Ramage | Jan. 14, 1902 |
| 1,008,321 | Gill | Nov. 14, 1911 |
| 1,368,748 | Penniman et al. | Feb. 15, 1921 |
| 1,392,925 | Fireman | Oct. 11, 1921 |
| 2,111,727 | Plews | Mar. 22, 1938 |
| 2,785,991 | Bennetch | Mar. 19, 1957 |

UNITED STATES PATENT OFFICE
CERTIFICATE OF CORRECTION

Patent No. 2,904,402            September 15, 1959

Paul Alfons Florent Cauterman

It is hereby certified that error appears in the above numbered patent requiring correction and that the said Letters Patent should read as corrected below.

Column 2, lines 61 and 71, and column 3, lines 31 and 35, before "gallons", each occurrence, insert -- imperial --.

Signed and sealed this 24th day of October 1961.

(SEAL)
Attest:

ERNEST W. SWIDER
Attesting Officer

DAVID L. LADD
Commissioner of Patents
USCOMM-DC